No. 702,793. Patented June 17, 1902.
C. H. O. HAMANN.
DIFFERENTIAL GEARING.
(Application filed Dec. 3, 1900.)
(No Model.)
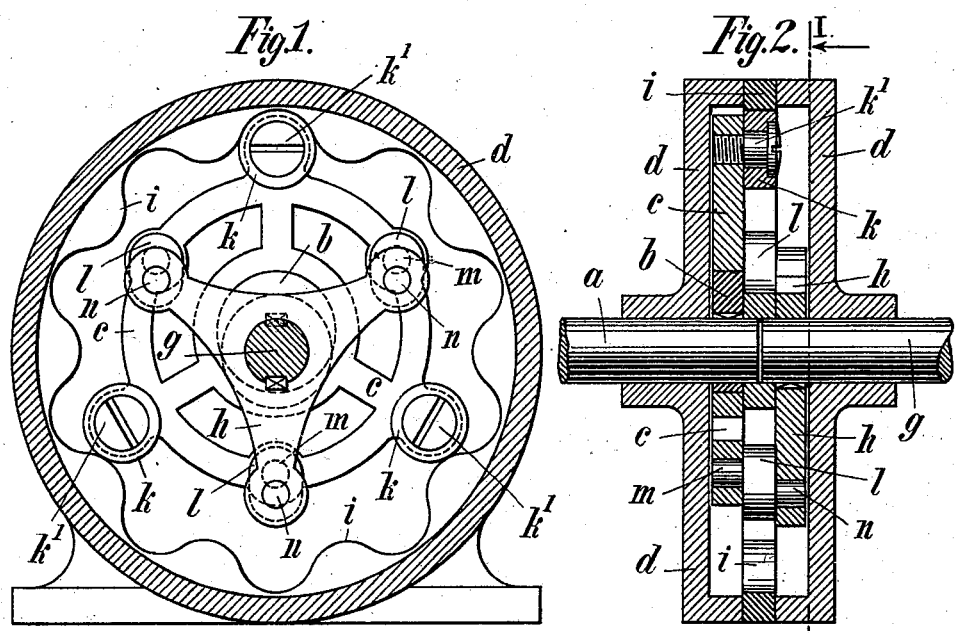
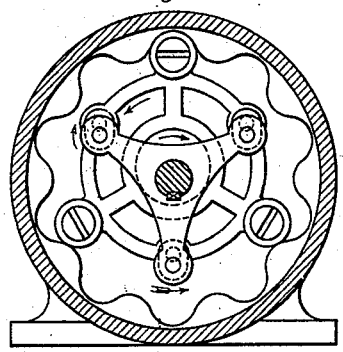
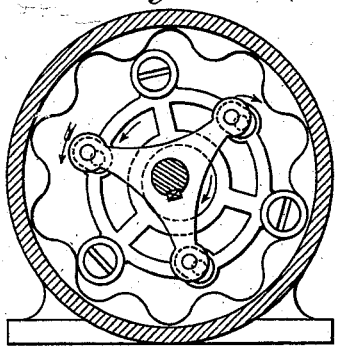
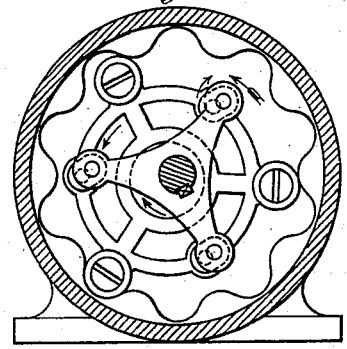
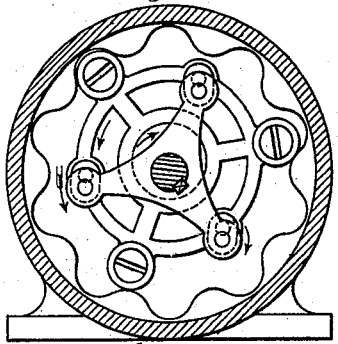

UNITED STATES PATENT OFFICE.

CARL HEINRICH OTTO HAMANN, OF BERGEDORF, NEAR HAMBURG, GERMANY.

DIFFERENTIAL GEARING.

SPECIFICATION forming part of Letters Patent No. 702,793, dated June 17, 1902.

Application filed December 3, 1900. Serial No. 38,543. (No model.)

*To all whom it may concern:*

Be it known that I, CARL HEINRICH OTTO HAMANN, a subject of the German Emperor, and a resident of Bergedorf, near Hamburg, Germany, have invented a certain new and useful Improved Differential Gearing, of which the following is a specification.

The subject of the present invention constitutes an improved differential gearing for transmitting rotary motion or, respectively, for increasing or reducing the rate of motion from a driving-shaft to the rate required by a coincident shaft to be driven; and it consists in the combination of parts hereinafter fully described, and pointed out in the claims.

In the accompanying drawings, Figure 1 is a side elevation, partly in section, on the line I II, Fig. 2; and Fig. 2 a central vertical cross-section of the improved differential gearing constructed and arranged in accordance with my invention. Figs. 3 to 6 are views similar to that shown by Fig. 1, drawn on a somewhat smaller scale and illustrating the action or mode of operation of the said gearing.

According to the constructional form of gearing a driving-shaft $a$ is furnished with an eccentric $b$, and upon the latter is loosely mounted a disk or wheel $c$, which is surrounded by a stationary undulating guide course or ring $i$, mounted within a cylindrical casing $d$. The dimensions and proportions of these parts are such that the wheel $c$ is always at one point in contact with or bearing on the guide course or ring $i$. The wheel $c$ is provided at three points (or more, if required) with guide-rollers $k$, attached to said wheel by means of headed screw-bolts $k'$ or the like. The rollers $k$ are set at equal radial distances from and at equal angles apart around the center of the wheel $c$.

The operation of the above-described gearing is as follows: When the driving-shaft $a$ is rotated, the eccentric $b$ rotates and the wheel $c$ is rolled along, with its guide-rollers $k$ on or in the undulated guide-ring $i$ and revolves at the same time around its center, which revolution is of a lower rate of speed and opposite to that of the eccentric $b$ or driving-shaft $a$, respectively. The transmission depends upon the proportion of the eccentricity of the driving-eccentric to the radius of the circle passing through the center of the guide-rollers $k$. The transmission of the rolling and revolving motion of the wheel $c$ to the disk $h$—that is to say, the conversion of the hypocycloidal motion into a circular—may also be effected by means of links $l$, rotatably mounted on pivots $m$ and $n$ of the wheel $c$ or the disk $h$, respectively. Three or more of such links may be provided. The distance between the pivots or studs $m$ and $n$, measured from center to center, is again equal to the eccentricity of the driving-eccentric $b$. When the gearing is in operation, the links $l$ draw the disk $h$ around and are revolved at the same time about themselves—i. e., about the pivots $m$ and $n$. The angular velocity of the links $l$ is equal to that of the driving-eccentric or driving-shaft, respectively, so that the said links after a complete revolution of the driving-shaft have performed, besides their progressive motion, also a complete revolution about their pivots. This gearing is suitable for use in heavy engines for transmitting rotary power at a proportionately smaller increase or reduction of speed.

Having fully described my invention, what I claim, and desire to secure by Letters Patent, is—

1. The combination with a driving-shaft, an eccentric thereon, a wheel on said eccentric and rollers carried at the periphery of said wheel; of an internally-toothed drum larger than said wheel, the rollers of which are arranged to engage the teeth on said drum during the revolution and rotation of the wheel, a driven shaft concentric with the driving-shaft, a spider thereon and a link connection between said spider and wheel, substantially as and for the purpose set forth.

2. The combination with a driving-shaft, an eccentric thereon, a wheel on said eccentric and rollers carried by the wheel; of a drum, provided with an undulating inner surface, larger than said wheel, the rollers of which are adapted to travel over said undulating surface, a driven shaft concentric with the driving-shaft, a spider thereon and a connection between the wheel and spider capable of revolving and rotating, substantially as and for the purpose set forth.

CARL HEINRICH OTTO HAMANN.

Witnesses:
 MAX LEMCKE,
 E. H. L. MUMMENHOFF.